Feb. 16, 1932.  R. F. HENNEUSE  1,845,499

THERMOSTATIC TEMPERATURE REGULATOR

Filed May 27, 1930

INVENTOR.
Richard F. Henneuse
BY
Fay, Oberlin & Fay
ATTORNEYS.

Patented Feb. 16, 1932

1,845,499

UNITED STATES PATENT OFFICE

RICHARD F. HENNEUSE, OF BUCYRUS, OHIO

THERMOSTATIC TEMPERATURE REGULATOR

Application filed May 27, 1930. Serial No. 456,050.

My invention, relating as indicated to a thermostatic temperature regulator, has specific reference to a thermostatically controlled device for mixing and controlling the temperature of fluids, whether liquid or gaseous. In order that a thermostatically controlled device be usable advantageously for the purpose of mixing relatively hot and cold fluids and simultaneously controlling the temperature of the fluid discharged therefrom according to a predetermined setting of such device, it is necessary that such thermostatic means be regulatable so that fluid of any desired temperature may be discharged therefrom. A further requirement of an efficient thermostatic device is that the several elements thereof be constructed and interrelated so that the thermostatic element employed therein accurately reflects the temperature of the discharging fluid and further, that such thermostatic element be instantly responsive to any minute changes in the temperature of the fluid passing through the device so that a constant temperature of the discharge fluid is maintained at all times.

When thermostatically operated mixing valves are employed in shower baths, and the like, it is necessary that such mixing valve be compact in structure so that it may be mounted in the confines of the wall without the necessity of expensive alterations in the building construction incidental to its installation. It is among the objects of my invention to provide a thermostatically controlled regulator or mixing valve for fluids which shall have all the above named desirable characteristics. Other objects of my invention will appear as the description proceeds. To the accomplishment of the foregoing and related ends, said invention, then, consists of the means hereinafter fully explained and particularly pointed out in the claims.

The annexed drawings and the following description set forth in detail certain mechanism embodying the invention, such disclosed means constituting, however, but one of various mechanical forms in which the principle of the invention may be used.

Figure 1:
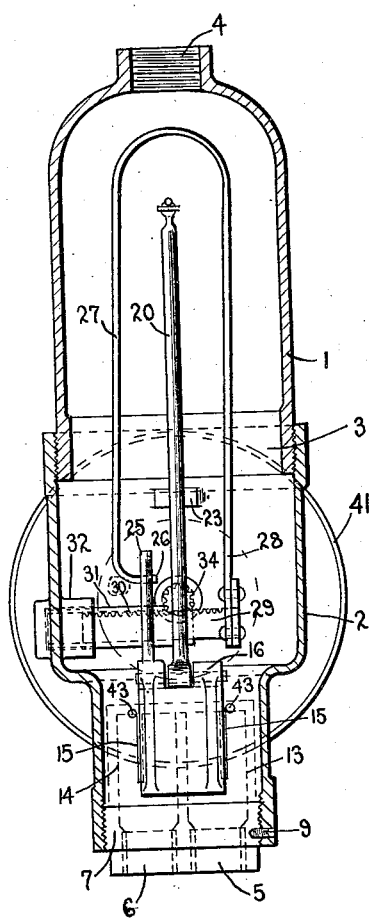
Figure 2:
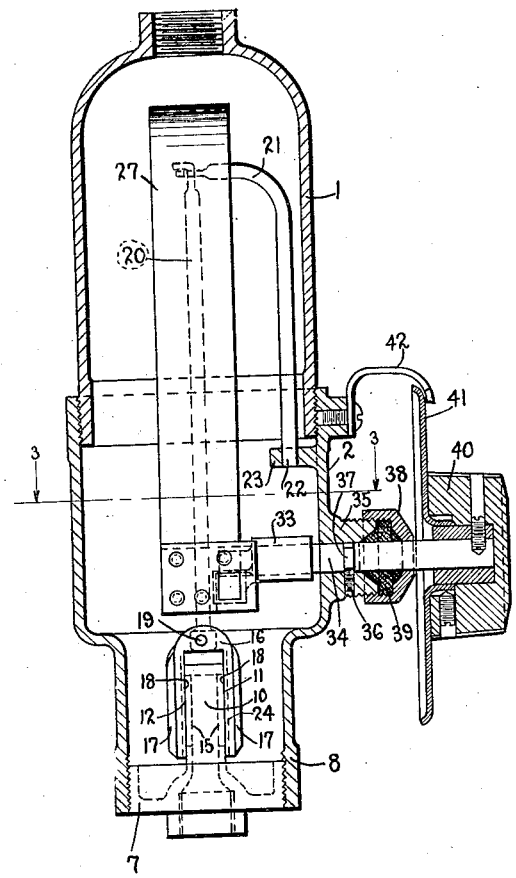
Figure 3:
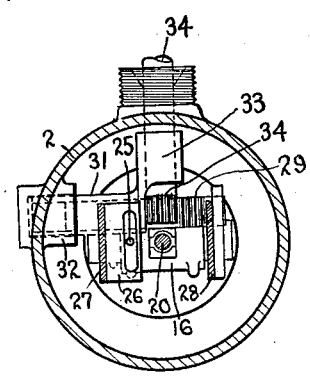

In said annexed drawings:

Fig. 1 is a part sectional, part elevational view of the mechanism comprising my invention; Fig. 2 is a part sectional, part elevation of the mechanism disclosed in Fig. 1, taken on a plane substantially at right angles to the illustration in Fig. 1; and Fig. 3 is a transverse fragmentary part sectional, part elevational view of the structure illustrated in previous figures taken on a plane substantially indicated by the line 3—3 in Fig. 2.

Referring more specifically to the drawings and more especially to Figs. 1 and 2, the thermostatically controlled regulator or mixing valve comprising my invention consists of a substantially tubular body and is formed of separable sections 1 and 2 which are threadably interconnected as at 3 so that disassembly thereof can readily be accomplished for the purpose of inspecting, repairing or making adjustments of the mechanism enclosed in the body. The section 1 has a discharge aperture 4 in one end thereof and the section 2 has inlet ports 5 and 6 in the opposite end thereof.

The inlet ports 5 and 6 are preferably formed in a cylindrical bushing 7 which is threadedly engaged by the reduced portion 8 of the lower section 2 and after assembly a dowel 9 may be employed for the purpose of preventing an uncoupling of the bushing 7 during the subsequent use of the device. The bushing 7 has a substantially rectangular projection 10 extending interiorly of the body 2 which projection has parallel opposite faces 11 and 12 for the purpose hereinafter more fully explained. The projection 10 has pockets 13 and 14 formed therein respectively in communication with the inlet ports 5 and 6. The lateral walls of the projection 10 which have the flat parallel faces 11 and 12 have ports 15 formed therein, which ports are preferably in the form of parallel longitudinal slots.

A valve 16 having spaced legs 17 with oppositely disposed flat faces 18 engages the opposite faces 11 and 12 of the projection 10, the width of such valve, specifically the legs 17 thereof, is preferably equal to the distance between the ports 15 on one side of the projection 10 plus the width of one of such ports, so that upon relative movement of the valve 16 with respect to the member 10 when one port is being closed the other port will be opened and when one port is completely closed the other of such ports will be entirely open. With this form of construction a relatively slight movement of the valve 16 effects a substantial control over the fluid discharged through the separate ports. The valve 16 has a pin 19 secured therein, which pin secures the lower terminal of a rod 20 by means of which the valve 16 is supported in proper relation to the projection 10. The supporting rod 20 is movably supported by a bracket 21 which is preferably secured at its lower terminal 22 to a projection 23 formed integrally with the lower member 2. The oppositely disposed faces 18 of the spaced legs 17 may be centrally recessed as at 24 throughout such portion of the valve which is not in contact with the ports so as to reduce the frictional resistance between such valve and the flat faces 11 and 12 of the projection 10.

The valve 16 has an arm 25 projecting upwardly therefrom and preferably formed integrally therewith. The arm 25 is engaged by the transversely slotted terminal 26 of a preferably U-shaped thermostatic element 27 which is positioned centrally in the mixing chamber formed by the members 1 and 2. The opposite terminal 28 of the thermostatic element 27 is secured to a rack 29 which is slidably mounted in an aperture 30 formed therefor in a sleeve 31 which is terminally mounted in a boss 32 and which has a sleeve 33 formed integrally therewith extending substantially at right angles to the axis of the aperture 30. The sleeve 33 has a shaft 34 journaled therein which shaft has a pinion formed on the terminal thereof in mesh with the rack 29. The shaft 34 is likewise journaled in a boss 35 which is adapted to receive a pin 36 which engages a groove 37 in the shaft 34 thereby axially restraining such shaft in the boss 35. A suitable stuffing box comprising an adjustable nut 38 and a packing material 39 may be employed in association with the boss 35 for the purpose of preventing fluid from flowing out of the mixing chamber along the sides of the shaft 34.

The shaft 34 may have an adjusting knob 40 secured thereto for the purpose of rotating such shaft, which knob may have an ordinal bearing disc 41 associated therewith, which disc in cooperation with an indicating arm 42 serves as an index for the temperature at which the device is set.

It will be noted in connection with the above description that the mixing valve comprising my invention is compact in structure and presents structural and operable advantages not found in any devices of this class heretofore employed. The U-shaped thermostatic element 27 has its terminals adjacent so that any looseness of the rack or associated control mechanism will not in any way effect the operation of such thermostatic element in controlling the valve 16. By forming the thermostatic element of a relatively thin band as indicated, such element will respond quickly to minute temperature changes in the fluid in the mixing chamber and consequently maintain constant the temperature of the fluid discharged from the mixing chamber. The thermostatic element position, centrally in the mixing chamber as described, has the further advantage in that the fluids entering such chamber from the inlet ports 15 are thoroughly mixed before coming in contact with such element so that the fluid prior to discharge only affects the temperature of the thermostatic element. The central position of the supporting arm 20 for the valve 16 is desirable from the standpoint of compactness of structure as well as the provision of a support for such valve at a point a considerable distance therefrom.

The provision of the inlet ports 15 on opposite faces 11 and 12 of the projection 10 presents advantages in that the fluid leaving such ports will exert equal pressures on the oppositely disposed legs 17 so that the frictional resistance between such legs and the faces containing the inlet ports is reduced to a minimum, thereby rendering more delicate the control of the valve by the thermostatic element 27.

The formation of the mixing chamber by means of the separable upper and lower elements 1 and 2 with all of the operating mechanism of the mixing valve secured to the latter member, permits disassembly of the device for inspection and adjustment without a disturbance of any of the operating parts of the mixing valve. The indicating arm 42 may be arranged so as to frictionally engage the index disc 41 so that any displacement of the adjusting means from that to which it has been set due to the action of the fluid in the interior of the mixing chamber, is entirely obviated.

By having the distance between the opposite faces 11 and 12 of the projection 10 less than the effective width of the valve 16, any tendency of such valve to bind or retard the efficient action of the thermostatic element 27 is reduced to a minimum. The projection 10 may have laterally projecting pins 43 secured thereto for the purpose of restraining or limiting excessive movement of the valve 16 which might otherwise occur during the initial setting of the regulator. By providing the limit pins 43, the knob 40 may be turned to the desired temperature as indicated by the indicating arm 42 and the disc 41, whereupon the valve 16 will be moved to uncover the suitable inlet port for the admission of either hot or cold fluid to the mixing chamber until such fluid has affected the temperature of the thermostatic element 27, which element under the influence of such temperature will then correct the position of the valve 16 to admit the proper proportions of hot and cold fluid through the inlet ports 15 from the inlet conduits 5 and 6. A further description of the principles comprising my invention is believed unnecessary for those familiar with the art, suffice it to say that numerous changes may be made in the preferred form thereof here illustrated and described for purposes of convenience without departing from the principles of my invention.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a thermostatically operated mixing valve, the combination of a mixing chamber, contiguous hot and cold fluid conduits provided with flat walls in a common plane extending into said chamber, inlet ports in said walls, a valve engaging said walls adapted upon movement thereover to simultaneously vary the fluid flow from each conduit through said ports, and a thermostatic element in said chamber for effecting such movement of said valve.

2. In a thermostatically operated mixing valve, the combination of a mixing chamber, contiguous hot and cold fluid conduits provided with oppositely arranged flat walls in common planes extending into said chamber, inlet ports in the opposite walls of each of said conduits, a valve engaging said walls adapted upon movement thereover to vary the fluid flow from each conduit through said ports, and a thermostatic element in said chamber for effecting such movement of said valve.

3. In a thermostatically operated mixing valve, the combination of a mixing chamber, contiguous hot and cold fluid conduits each provided with walls having parallel flat faces in common planes, inlet ports in said walls of each of said conduits, a valve engaging said walls adapted upon movement thereover to vary the fluid flow from each conduit through said ports, and a thermostatic element in said chamber for effecting such movement of said valve.

4. In a thermostatically operated mixing valve, the combination of a mixing chamber, contiguous hot and cold fluid conduits each provided with walls having parallel flat faces in common planes, inlet ports in the form of slots in said walls of each of said conduits, a valve engaging said walls adapted upon movement thereover to vary the fluid flow from each conduit through said ports, and a thermostatic element in said chamber for effecting such movement of said valve.

5. In a thermostatically operated mixing valve, the combination of a mixing chamber, contiguous hot and cold fluid conduits each provided with walls having parallel flat faces in common planes, inlet ports in said walls of each of said conduits, a valve having parallel oppositely disposed faces, the valve engaging said walls adapted upon movement thereover to vary the fluid flow from each conduit through said ports, and a thermostatic element in said chamber for effecting such movement of said valve.

6. In a thermostatically operated mixing valve, the combination of a mixing chamber, contiguous hot and cold fluid conduits provided with flat walls in a common plane extending into said chamber, inlet ports in said walls, a valve engaging said walls adapted upon movement thereover to vary the fluid flow from each conduit through said ports, and a regulatable thermostatic element in said chamber for effecting such movement of said valve.

7. In a thermostatically operated mixing valve, the combination of a mixing chamber, contiguous hot and cold fluid conduits provided with oppositely arranged flat walls in common planes extending into said chamber, inlet ports in the opposite walls of each of said conduits, a valve engaging said walls adapted upon movement thereover to vary the fluid flow from each conduit through said ports, and a regulatable thermostatic element in said chamber for effecting such movement of said valve.

8. In a thermostatically operated mixing valve, the combination of a mixing chamber, contiguous hot and cold fluid conduits each provided with walls having parallel flat faces in common planes, inlet ports in said walls of each of said conduits, a valve engaging said walls adapted upon movement thereover to vary the fluid flow from each conduit through said ports, and a regulatable thermostatic element in said chamber for effecting such movement of said valve.

9. In a thermostatically operated mixing valve, the combination of a mixing chamber, contiguous hot and cold fluid conduits each provided with walls having parallel flat faces in common planes, inlet ports in the form of slots in said walls of each of said conduits, a valve engaging said walls adapted upon movement thereover to vary the fluid flow from each conduit through said ports, and a regulatable thermostatic element in said chamber for effecting such movement of said valve.

10. In a thermostatically operated mixing valve, the combination of a mixing chamber, contiguous hot and cold fluid conduits each provided with walls having parallel flat faces in common planes, inlet ports in said walls of each of said conduits, a valve having parallel oppositely disposed faces, the valve engaging said walls adapted upon movement thereover to vary the fluid flow from each conduit through said ports, and a regulatable thermostatic element in said chamber for effecting such movement of said valve.

11. In a thermostatically operated mixing valve, the combination of a mixing chamber, contiguous hot and cold fluid conduits provided with flat walls extending into said chamber, inlet ports in said walls, a valve engaging said walls adapted upon relative movement therewith to simultaneously vary the fluid flow through each of said ports, and a U-shaped regulatable thermostatic element in said chamber for effecting such movement of said valve.

12. In a thermostatically operated mixing valve, the combination of a mixing chamber, contiguous hot and cold fluid conduits each provided with walls having parallel flat faces, inlet ports in said walls of each of said conduits, a valve engaging said walls adapted upon relative movement therewith to simultaneously vary the fluid flow through each of said ports, and a U-shaped regulatable thermostatic element in said chamber for effecting such movement of said valve.

13. In a thermostatically operated mixing valve, the combination of a mixing chamber, contiguous hot and cold fluid conduits each provided with walls having parallel flat faces, inlet ports in the form of slots in said walls of each of said conduits, a valve engaging said walls adapted upon relative movement therewith to simultaneously vary the fluid flow through each of said ports, and a U-shaped regulatable thermostatic element in said chamber for effecting such movement of said valve.

14. In a thermostatically operated mixing valve, the combination of a mixing chamber formed of separable sections; one of said sections provided with a discharge port; and the other of said sections provided with hot and cold fluid inlet ports in a common wall, a valve for said ports engaging said wall in a slidable relation, and a thermostatic element for effecting movement of said valve inversely varying the flow of fluid through each of said ports.

15. In a thermostatically operated mixing valve, the combination of a mixing chamber formed of separable sections; one of said sections provided with a discharge port; and the other of said sections provided with hot and cold fluid inlet ports in a common flat wall, a valve for said ports engaging said wall in a slidable relation, and a U-shaped regulatable thermostatic element extending into said first named section for effecting movement of said valve simultaneously varying the flow of fluid through each of said inlet ports.

16. In a thermostatically operated mixing valve, the combination of a mixing chamber, hot and cold fluid conduits extending into such chamber each provided with walls having oppositely disposed flat faces, inlet ports in said walls, a valve engaging said walls adapted upon relative movement therewith to vary the fluid flow through each of said ports, means extending centrally of said chamber movably supporting said valve, and a U-shaped thermostatic element positioned centrally of said chamber adapted to effect such movement of said valve.

17. In a thermostatically operated mixing valve, the combination of a mixing chamber, hot and cold fluid conduits extending into such chamber each provided with walls having oppositely disposed flat faces, inlet ports in said walls, a valve engaging said walls adapted upon relative movement therewith to vary the fluid flow through each of said ports, means extending centrally of said chamber movably supporting said valve, and a U-shaped thermostatic element positioned centrally of said chamber having one terminal secured to said valve and the other terminal thereof secured to movable means for regulating the temperature of the fluid discharged from said chamber.

18. In a thermostatically operated mixing valve, the combination of a mixing chamber, hot and cold fluid conduits extending into such chamber each provided with walls having oppositely disposed flat faces, inlet ports in said walls, a valve engaging said walls adapted upon relative movement therewith to vary the fluid flow through each of said ports, means extending centrally of said chamber movably supporting said valve, and a U-shaped thermostatic element positioned centrally of said chamber having one terminal secured to said valve, movable means extending through the wall of said chamber, and the other terminal of said thermostatic element secured to means associated with said movable means.

19. In a thermostatically operated mixing valve, the combination of a mixing chamber, hot and cold fluid conduits extending into such chamber each provided with walls having oppositely disposed flat faces, inlet ports in said walls, a valve engaging said walls adapted upon relative movement therewith to vary the fluid flow through each of said ports, means extending centrally of said chamber movably supporting said valve, a U-shaped thermostatic element positioned centrally of said chamber, one terminal of said element secured to said valve, a rotatable shaft extending through the wall of said chamber, a rack and pinion associated with said shaft, and the other terminal of said thermostatic element secured to said rack.

20. In a thermostatically operated mixing valve, the combination of a mixing chamber, hot and cold fluid conduits terminating in ports in a flat wall extending into said chamber, a valve slidably engaging said wall adapted upon movement thereover to cover one of said ports as it uncovers the other, and a thermostatic element in said chamber for effecting such movement of said valve.

21. In a thermostatically operated mixing valve, the combination of a mixing chamber, hot and cold fluid conduits terminating in ports in opposite parallel sides of a block extending into said chamber, a valve member, having two oppositely disposed faces, one closely engaging each of said sides, pivotally suspended at a point above said block, and adapted upon movement to cover one of said ports as it uncovers the other, and a thermostatic element in said chamber for effecting such movement of said valve.

Signed by me this 22d day of May, 1930.

RICHARD F. HENNEUSE.